Figure 1:
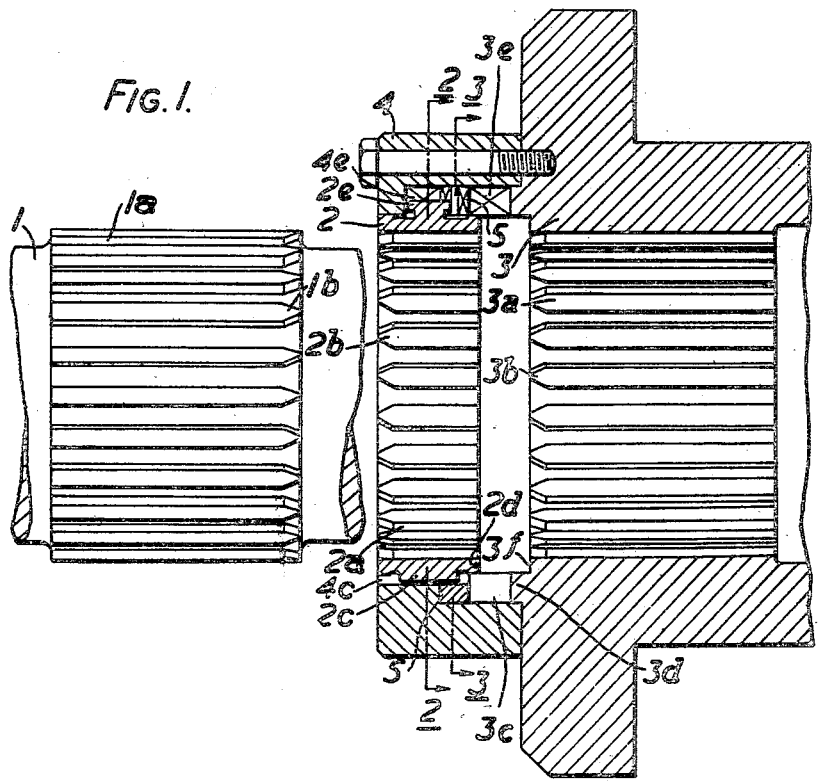

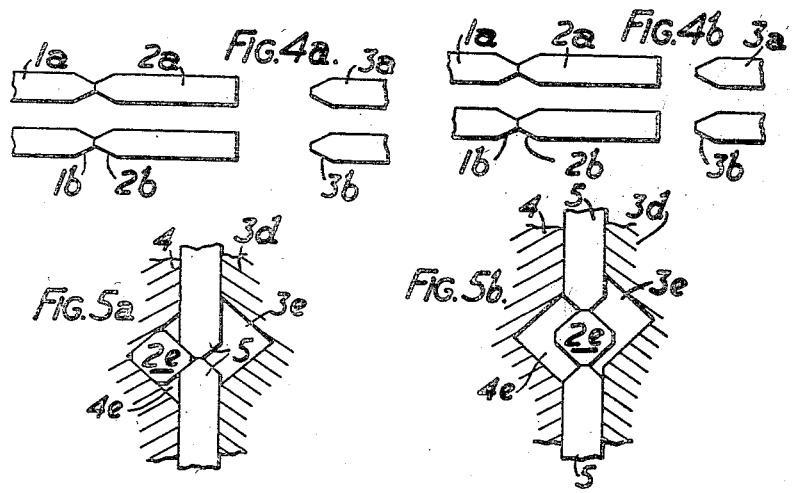
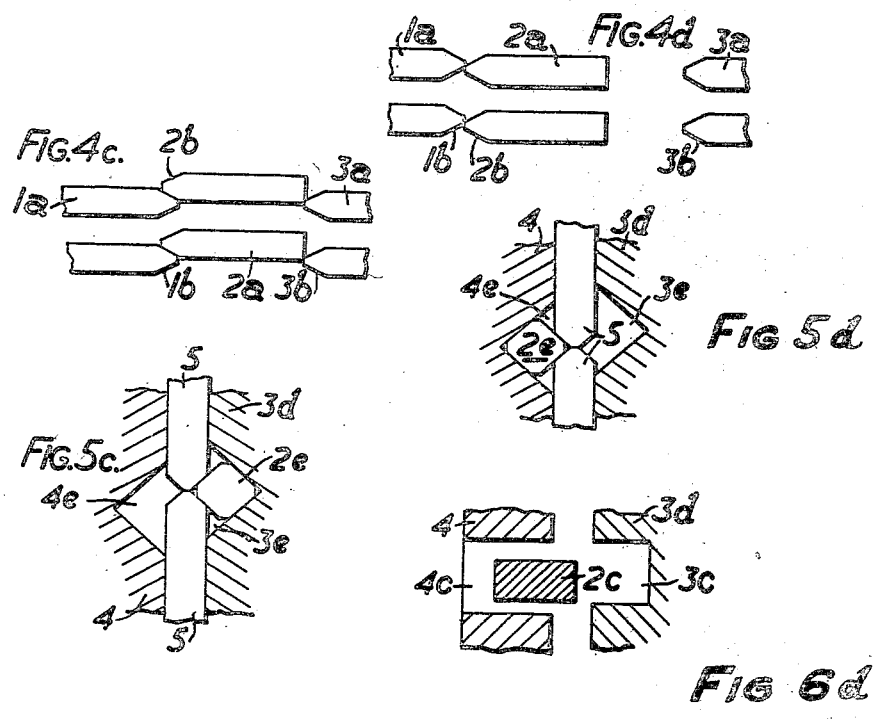

United States Patent Office 2,821,277
Patented Jan. 28, 1958

2,821,277

SPLINED CLUTCHES

John Oliver Philip Hughes, Leicester, England, assignor to The English Electric Company Limited, London, England, a British company Application October 21, 1954, Serial No. 463,672

Claims priority, application Great Britain November 11, 1953

4 Claims. (Cl. 192—67)

The present invention is a development of the invention described and claimed in my patent specification No. 2,665,788 which relates to a splined clutch.

A splined coupling according to the said patent specification is applicable for example to constant mesh reverse gears in which a driving shaft is to be brought from a neutral position into alternative engagement with two gears in order to drive an output shaft in opposite directions.

Splined clutches occupy a small space only and are capable of being run at very high shaft speeds. Their design is simple and they are reliable in operation; they require small forces for engagement and disengagement so that they can be manually operated even for high shaft power and do not require fluid pressure or servo-motors for their operation. Prior to the said Patent No. 2,665,788 these well known advantages of splined clutches had been offset by the following difficulties:

Splined clutches can be engaged in relative positions only of the two splined members in which the ridges of one member are in juxtaposition to the grooves of the other member, and in no other relative position.

Attempts to engage a splined clutch while either the driven or the driving member is in motion may result in permanent damage to the splines.

Accordingly a slip coupling, such as a hydraulic or friction clutch had to be inserted between the prime mover and the splined clutch, which slip coupling had to be capable of transmitting the full torque and was therefore heavy, bulky, expensive etc., whereby most of the above advantages of the splined coupling were offset.

According to my patent specification No. 2,665,788 a first auxiliary member is coupled with limited rotational freedom to one of the said main splined members and carries a series of magnets the alternating N- and S-poles of which are disposed at half the pitch of the spline of the said main splined members, and which co-operates with a second auxiliary member coupled for rotation with the second main splined member and carrying a corresponding series of magnets, whereby the said first auxiliary member is turned by magnetic attraction and repulsion into a position in which its inward projections form a guide for the chamfered edges of the splines of the said second main splined member into an engageable position relative to the chamfered edges of the splines of the said first main splined member, the torque for turning the said main splined members relative to one another into engageable positions being derived from the axial force for shifting them into engagement owing to wedge action of the said inward projections and chamfered splines on one another, and not from the aforesaid magnetic repulsion and attraction.

Splined clutches can be used in cases where one of the main splined members cannot be rotated prior to engagement while the other main splined member can be rotated. This condition prevails for example in a road roller, in a rolling mill, or in a gas turbine driven locomotive wherein two mechanically independent turbines are provided, one of which (the "charging turbine") drives the compressor, and the other one (the "power turbine") drives the locomotive mechanically.

In the latter case, the rotor of the power turbine can be easily turned while the locomotive is held stationary by means of its wheel brakes and while the charging turbine is idling. However, if left to itself, the rotor of the power turbine would also rotate at an idling speed under the torque of the exhaust gases from the compressor turbine with which it is in series flow connection. The rotor of the power turbine has therefore to be restrained from idling while being allowed a small angular adjustment as required for its shaft engaging the splined clutch. A spring balanced brake can for example be used for this purpose, the spring of which is sufficiently strong to balance the said torque, but which has a sufficiently flat characteristic to allow the said brake to be turned together with the rotor of the power turbine a small angle from the equilibrium position in either direction, as required for engaging the splined coupling. When the brake is applied, the spring will be wound up by the kinetic energy of the idling power turbine rotor, until it reaches a stop. The brake with the power turbine gripped in it will then turn in to an equilibrium position in which the torque of the spring is just balanced by the torque exerted by the exhaust gases of the charging turbine on the power turbine rotor.

If in this equilibrium position the splines of the driving members of the clutch are in juxtaposition to the grooves between splines of the driven member and vice versa, the clutch can be engaged easily. If, however, the splines of the two members stand end-to-end, engagement would not be possible, and according to my patent specification No. 2,665,788 magnetic means are provided for turning the pilot ring into a position which makes the clutch engageable. A spring balanced brake holding the rotor allows the same to be turned a small angle by an axial force applied to the driving member reacted on the chamfered edges of the splines thereof, in order to allow the clutch to be engaged.

According to the present invention this turning of one of the components of the clutch relative to the other one, with which it has to be engaged, is attained purely mechanically without the aid of magnetic means, in that in a clutch for engaging two co-axial main splined members which are axially slidable into and out of one another an internally splined auxiliary member splined the same way as the internally splined main member is provided with a limited angular freedom of movement relative to one of the said main splined members, the said auxiliary member being angularly adjusted prior to the engagement of the two main splined members automatically into a position in which it guides the two members into an engageable relative position, the angular adjustment of the two main splined members being effected by the reaction of chamfered spline tips of members being moved axially relative to one another.

For example a pilot ring, internally splined the same way as the driven member, is mounted at the entry thereof with a limited degree of rotational and axial freedom, the splines of said pilot ring and those of the driven member being chamfered towards the chamfered ends of the externally splined driving member, and the said pilot ring is provided with lozenge-shaped projections facing corresponding V-grooves at opposite sides in the faces of the driven member and on an inner shoulder of a carrier ring fixedly connected to the driven member, the said V-grooves being angularly offset approximately half the angular pitch of the splines.

In the said carrier ring pairs of latch segments having chamfered tips are arranged circumferentially slidable, and are spring biased towards one another.

By an axial movement of the driven member towards the driving member which involves abutting of the splines of the driving member on those of the said pilot ring (which in the rest position are in alignment with those of the driven member) the said pilot ring is slid axially towards the said driven member, and by its lozenge-shaped projections forces apart the spring biased latch segments until the latter slide to the other side of the lozenges where they apply an axial impulse on them owing to the energy previously stored in their biasing springs, projecting the pilot ring towards the driven member and slightly turning the same by contact of its lozenge-shaped projections with the angularly offset V-grooves of the driven member. Thereby firstly the splines of the pilot ring are brought into an engageable position relative to those of the driving member, and then the latter when further advanced axially towards the driven member is slightly turned about its axis by the contact of its chamfered spline tips with those of the said pilot ring. This turning movement of the driving member is made possible by its being held in the aforesaid spring balanced brake.

Figure 2:
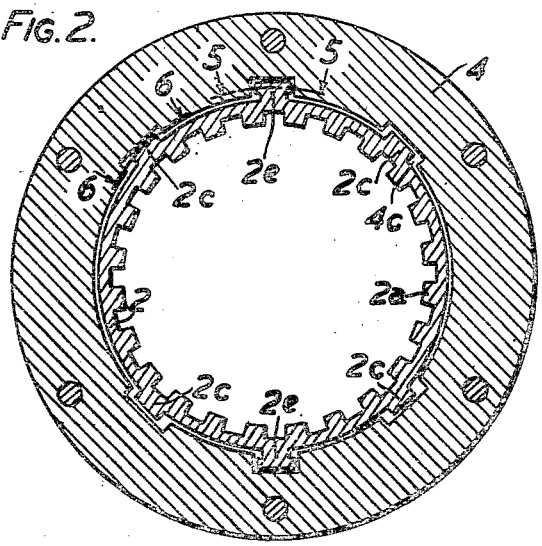
Figure 3:
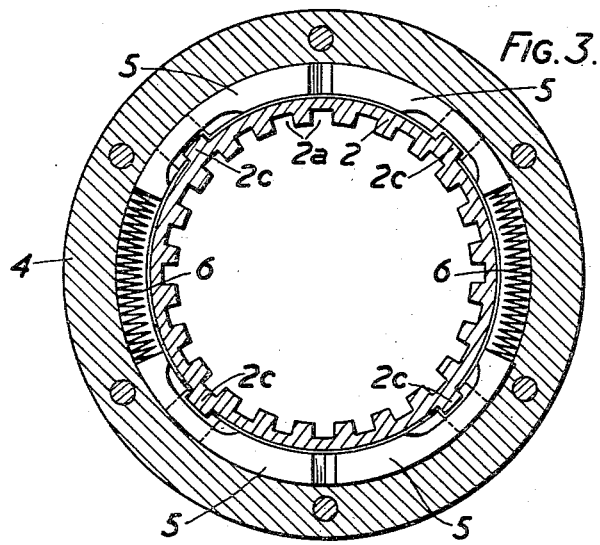

In order that the invention may be clearly understood, and readily carried into effect, an embodiment thereof will now be described by way of example with reference to the accompanying drawings, in which:

Fig. 1 is an axial section through the splined coupling according to the present invention in a position preceding engagement, Fig. 2 is a transverse section along the line 2—2 of Fig. 1, and Fig. 3 is a transverse part section along the line 3—3 of Fig. 1.

Figs. 4a, b, c, d, e show diagrammatically a pair of spline ridges of each of the two main splined members and the auxiliary splined member guiding them into engagement, in five different relative positions.

Figure 4E:
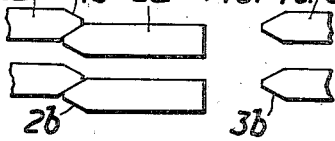
Figure 5E:
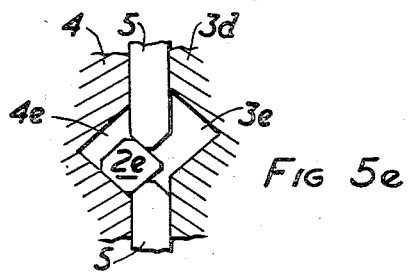

Figs. 5a, b, c, d, e are developed circumferential sections on the line 5—5 of Fig. 2, and Figs. 6d, e are similar sections continued on the line 6—6 of Fig. 2, the Figs. 5a–e corresponding to the positions of Figs. 4a–e respectively, and Figs. 6d, e corresponding to Figs. 4d, e and 5d, e.

Figure 6E:
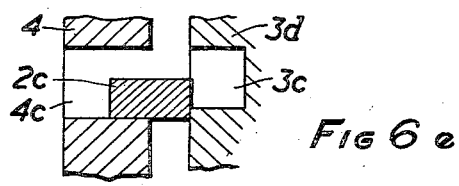

The driving shaft 1 is provided with spline ridges 1a, the ends of which are all chamfered towards the driven member 3 as at 1b. Ahead of the driven member 3 a pilot ring 2 is mounted in a carrier ring 4 which holds it concentric with the driven member 3 and limits its angular movement about the axis of rotation by contact of four teeth 2c of the pilot ring with the radial faces of recesses 4c in said carrier ring 4 which are wider than the said teeth 2c (Figs. 6d and 6e). In addition to this angular movement the pilot ring 2 is allowed axial travel in the direction towards the driven member 3 until its face 2d abuts on the end face 3f of the latter. Moreover the pilot ring 2 has two lozenge-shaped projections 2e, arranged diametrically opposite each other as shown in Fig. 2. The lozenge-shape of these projections will be seen in Figs. 5a–e. There is also a latch ring provided in the carrier ring 4, which latch ring consists of four segments 5 and two springs 6 as shown in Fig. 3.

The carrier ring 4 has two V-shaped notches 4e with which the said lozenge-shaped projections 2e engage, and when the pilot ring 2 is at rest in this position its splines 2a are in alignment with the splines 3a of the driven member 3 (Figs. 4a and 5a). These segments 5 are circumferentially slidable in the carrier ring 4 but are located axially by the groove left between the inner end face of the carrier ring 4 and the face of a spigot 3d projecting from the face 3c of the driven member 3. This spigot 3d has four radial slots 3c to receive the teeth 2c when the pilot ring 2 is slipped back into it, and has moreover two V-shaped grooves 3e similar to those 4e of the carrier ring 4, facing the same and angularly offset from them approximately one half pitch of the splines as shown in Figs. 5a–e. In this way the pilot ring 2 is turned an amount determined by the said offset between the V-grooves 4e and 3e into which the lozenge-shaped projections 2e of the pilot ring engage in the course of its axial travel. The springs 6 of the latch ring assembly press the chamfered ends of the four segments 5 thereof together and since these chamfered ends rest on the flanks of the lozenges 2e the latter are pressed initially into the V-shaped grooves 4e of the carrier ring 4 as shown in Fig. 5c.

The mechanism functions in the following way:

When the driving shaft 1 and the driven member 3 come to rest in an engageable position the shaft 1 will slide through the pilot ring 2 without affecting its position. The length of the splines 1a on the shaft 1 and the stroke thus given to the latter are such that the splines 1a pass right through the pilot ring 2, and the position normally occupied by the latter is shown in Fig. 1.

When the shaft 1 comes to rest so that its spline ridges 1a are opposite the spline ridges 2a of the pilot ring 2 it also means that they are opposite the spline ridges 3a of the driven member 3 (Fig. 4a); then as the shaft 1 is slid towards the pilot ring 2 the tips 1b of its spline ridges 1a will come into contact with the tips 2b of the spline ridges 2a of the pilot ring 2. Further axial motion of the shaft 1 will carry the pilot ring 2 with it (Fig. 4b), forcing apart the segments 5 (Fig. 5a) of the latch ring and compressing the springs 6. When the position of Figs. 4b and 5b has been reached any slight further movement of the shaft 1 in the axial direction will bring the chamfered flanks of the lozenges 2e beyond the chamfered ends of the segments 5, when the whole assembly of the pilot ring 2 will be projected in the axial direction towards the driven member 3 by the force stored in the springs 6. This movement lifts the spline ridges 2a of the pilot ring 2 clear of the tips 1b of the spline ridges 1a on the driving shaft 1 and throws the pilot ring 2 into the position shown in Figs. 4c and 5c.

There is now possible flank-to-flank engagement of the chamfered spline ends 1b of the driving shaft 1 and 3b of the driven member 3, but nothing has yet occurred to alter the relationship of the driving shaft 1 to the driven member 3. This is now brought about by continuing to push the shaft 1 towards the driven member 3 whereby the shaft 1 is slightly turned because of the reaction of the inclined faces of the tips 1b with those of the tips 2b of the splines 2a of the pilot ring 2 (Fig. 4c).

The force required to turn the driving shaft 1 is not large because of the torque balance achieved by the spring balanced brake (not shown) which can be of the same form as according to my patent specification No. 2,665,788.

The driving shaft 1 will then slide through the pilot ring 2 and is being guided so that the chamfers 1b at the tips of its spline 1a will mesh with the chamfered tips 3b of the splines 3a of the driven member 3, thereby producing further slight rotation of the shaft 1 and completion of engagement.

As the driving shaft 1 moves into engagement with the driven member 3 the pilot ring 2 is brought back into a central position relative to the carrier ring 4 but still on the opposite side of the latch ring to the position from where it started. As the shaft 1 passes through the pilot ring 2 the latter returns to the position shown in Figs. 4c, 5c. This is necessary in order that on disengagement of the driving shaft 1 from the driven member 3 the mechanism is automatically reset into a position of readiness for the next engagement. This is effected by contact between the square back faces of the spline ridges 1a with the annular faces 2d of the pilot ring 2. These ridges are integral with the shaft 1 so that the pilot ring 2 is carried right through the latch ring 5 and is also angularly restored to the position of the Figs. 4a, 5a.

When the pilot ring 2 is thus carried through ring 2, the springs 6 are firstly loaded, and then expand, throwing the lozenge-shaped projections 2e into the recesses 4e of the carrier ring 4. As these recesses 4e are offset circumferentially with respect to the recesses 3e in the face of the spigot 3d of the driven member 3 the pilot ring 2 is turned accordingly into a position in which its splines 2a are in alignment with the splines 3a of the driven member 3. The splines 1a leaving those of the driven member 3 accordingly register with those of the pilot ring 2, and can pass smoothly through them.

When the driving shaft 1 is in a position as shown in Figs. 4d, 5d in which the chamfered tips 1b of its spline ridges 1a are slightly overlapping with those 2b of the pilot ring 2 the latter will be rotated by the interaction of the two inclined planes, and it is necessary to limit this rotation so that some rotation is imparted to the driving shaft 1 before the latter is able to engage with the driven member 3. This is done by the aid of the four teeth 2c coming into engagement with the annular end face of the spigot portion 3d of the driven member 3 as shown in Fig. 6e. Thereby the latch ring 5 is forced apart only to the extent necessary to give the desired overlap of the contacting chamfered ends of the ridges (Fig. 4e).

This stopping is necessary for this particular condition of engagement because the direction in which the pilot ring 2 will turn when projected towards the driven member 3 is fixed. Otherwise a jammed condition could result if the pilot ring 2 were allowed to pass the latch ring.

On the other hand, should the driving shaft 1 come to rest with the chamfered tips 1b of its splines 1a on the other side of the chamfered ends 3b of the splines 3a of the driven member 3 as opposed to the position shown in Fig. 4e, the pilot ring 2 will be turned by the driving shaft 1 in the direction which it would take in any case, when being projected towards the driven member 3.

The reason for this projection is that the pilot ring 2 must throw itself off the tips 1b of the shaft splines 1a, because owing to friction it would be possible for the position shown in Figs. 4e, 5e to result in exactly the same motion as that shown in Figs. 4c, 5c, i. e. the pilot ring 2 would be carried straight back but with sufficient overlap on the flanks of the splines 1b, 2b, respectively to prevent its turning as the lozenges 2e mesh with the V-groove 3e in the face of the spigot 3d of the driven member 3.

What I claim as my invention and desire to secure by Letters Patent is:

1. A clutch comprising in combination two co-axial main splined members axially slidable into and out of one another, having splines chamfered at the ends facing one another prior to the engagement thereof, an auxiliary member being internally splined the same way as, and being arranged with a limited angular and axial freedom relative to one of the said main splined members, the ends of the splines of said auxiliary member facing those of the other one of the said main splined members being chamfered, lozenge-shaped radial projections arranged on the circumference of the said auxiliary member, segment members mounted circumferentially slidably in the said first main splined member and having chamfered ends engaging the said lozenge-shaped projections, resilient means biasing the said segment members against the said lozenge-shaped projection firstly opposing the axial and angular movement of the said auxiliary member relative to the said first main splined member, the force for moving the said auxiliary member axially and turning the same into a position guiding the said second splined member into engagement with the said auxiliary member being then derived from the energy stored in the said resilient means, upon moving the said other main splined member axially relative to said auxiliary member, and the torque for turning the said main splined members into a mutually engageable position being derived from the axial force shifting the same into engagement, owing to the wedge action of the engaging chamfered faces.

2. A clutch comprising in combination a driving and a driven main splined member axially slidable into and out of one another, having splines chamfered at the ends facing one another prior to the engagement thereof, a carrier ring fixed to the said driven main splined member the said carrier ring and associated driven main splined member having in their end faces facing one another V-grooves offset relative to one another half a pitch of the said splines, pairs of latch segments slidable circumferentially in the said carrier ring, compression springs housed in the said carrier ring biasing the ends of the latch segments of each pair towards one another, the said ends being chamfered, a pilot ring arranged with a limited angular and axial freedom relative to and within the said carrier ring and being internally splined the same way as the said driven main splined member, the splines of the said pilot ring having their ends facing those of the splines of the driving main splined member chamfered, lozenge-shaped radial projections arranged on the outer circumference of the said pilot ring adapted to be engaged each by the chamfered ends of a pair of the said segments and to engage alternately one of the said V-grooves in the said carrier ring and driven main splined member associated therewith, the force moving the said pilot ring axially and turning the same into a position guiding the said driving main splined member into engagement with the said pilot ring being derived from the energy stored in the said compression springs when forcing the said pilot ring with its lozenge-shaped projections against the chamfered ends of the said latch segments by axially moving the said driving main splined member relative to the said pilot ring, and the torque for turning the said main splined members into a mutually engageable position being derived from the axial force shifting the same into engagement, owing to the wedge action of the enngaging chamfered faces.

3. A clutch as claimed in claim 2, comprising in addition rectangular teeth arranged on the outer circumference of the said pilot ring engaging into wider recesses of the said carrier ring and abutting laterally on radial faces thereof and axially on the said end face of the driven main splined member ring in an end position of the said pilot ring relative to the said main splined member, the said rectangular teeth and recesses determining the rotational and axial freedom of the said pilot ring when the same is rotated in the direction opposite to that imparted to it by the said latch segments and the said offset V-grooves.

4. A clutch as claimed in claim 3, wherein recesses are provided in the said end face of the driven main splined member which are wider than the said rectangular teeth but narrower than the said recesses in the said carrier ring, the said teeth being accommodated in these recesses of the driven main splined member in the fully engaged condition of the clutch.

References Cited in the file of this patent

UNITED STATES PATENTS

| | | |
|---|---|---|
| 1,777,480 | Schoonmaker | Oct. 7, 1930 |
| 2,665,788 | Hughes | Jan. 12, 1954 |
| 2,667,252 | Meyer | Jan. 26, 1954 |